H. B. JONES.
TIRE PUMP.
APPLICATION FILED FEB. 23, 1916.
1,217,771.
Patented Feb. 27, 1917.
2 SHEETS—SHEET 1.
Fig. 1
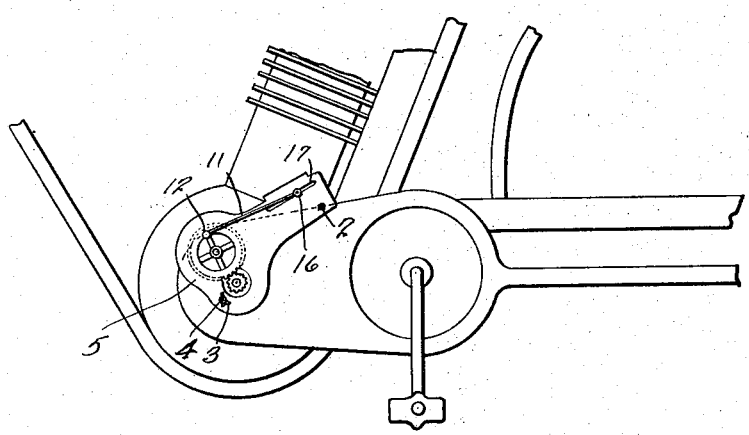
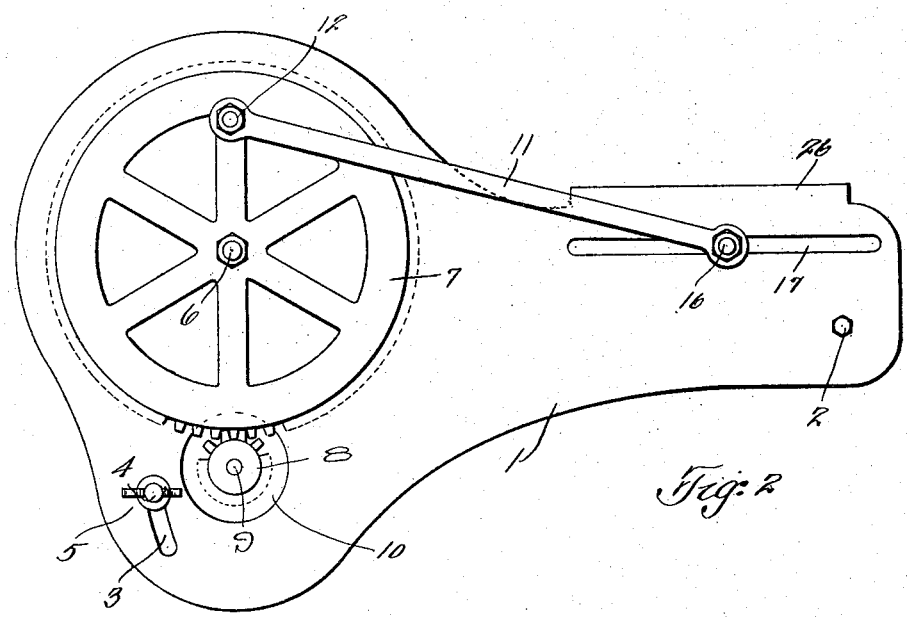
Fig. 2
Witnesses
Chas H. Trotter
Rob't Meyer
Inventor
H. B. Jones
By
Attorney H. B. JONES.
TIRE PUMP.
APPLICATION FILED FEB. 23, 1916.
1,217,771.
Patented Feb. 27, 1917.
2 SHEETS—SHEET 2.
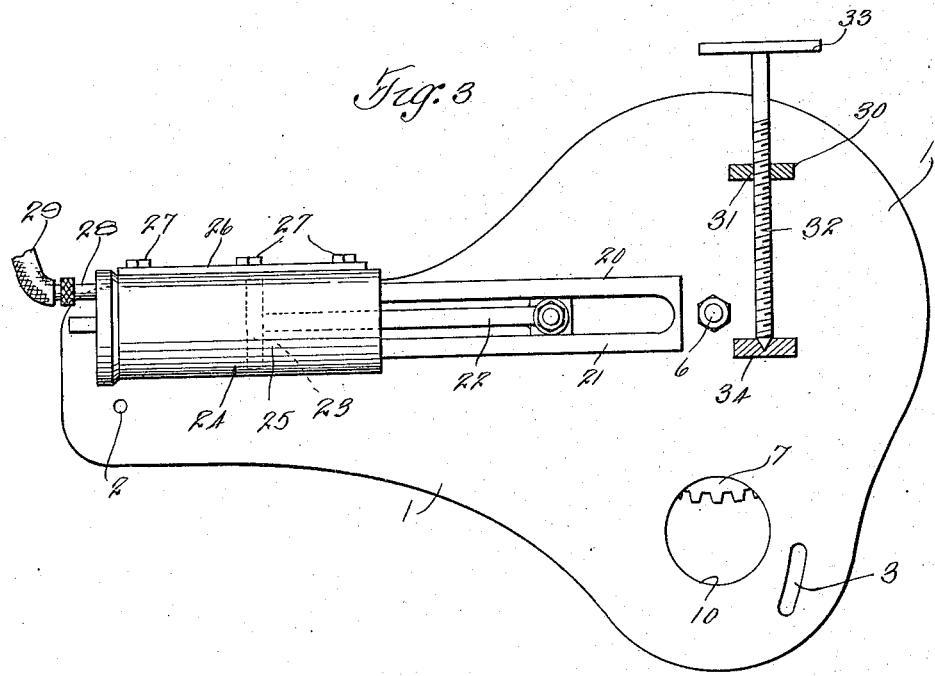
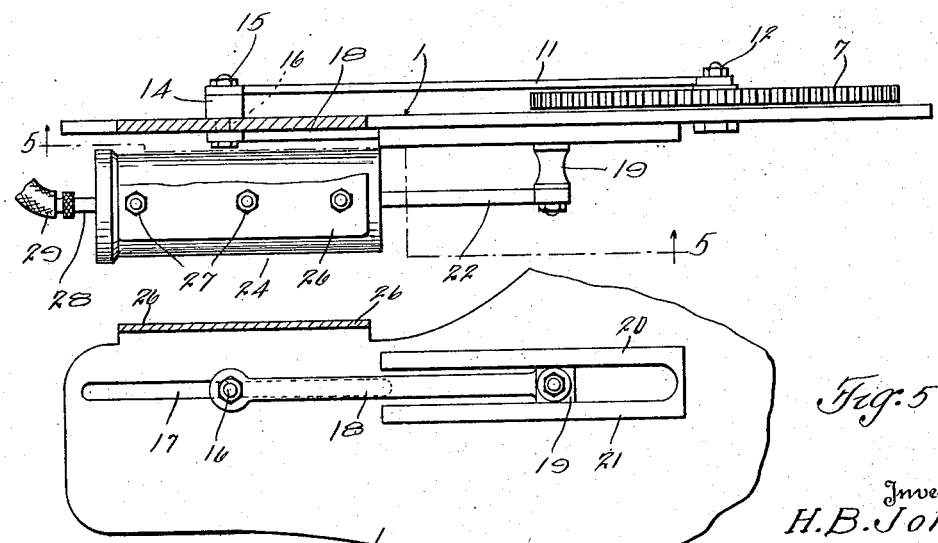
Inventor
H. B. Jones
Witnesses

UNITED STATES PATENT OFFICE.

HARRY BYRON JONES, OF CLAY CITY, INDIANA.

TIRE-PUMP.

1,217,771.

Specification of Letters Patent. Patented Feb. 27, 1917.

Application filed February 23, 1916. Serial No. 79,985.

*To all whom it may concern:*

Be it known that I, HARRY B. JONES, a citizen of the United States, residing at Clay City, in the county of Clay and State of Indiana, have invented certain new and useful Improvements in Tire-Pumps; and I do hereby declare the following to be a full, clear, and exact description of the invention, such as will enable others skilled in the art to which it appertains to make and use the same.

This invention relates to tire pumps, and the primary object of the invention is to provide a pump structure and means for operating the same which is applicable for attachment to motor cycles and to provide means for driving or operating the pump by the main drive shaft of the motor cycle.

A further object of this invention is to provide means for moving the pump operating means into and out of operative connection with the main drive shaft of a motor cycle.

Another object of this invention is to provide in a device as specified, a body plate which is pivotally connected to a supporting frame of a motor cycle and carries an ordinary reciprocatory piston air compressing pump which may be operatively connected to the pneumatic tire of the motor cycle for pumping air into the tires when necessary, a gear rotatably carried by the pivoted plate and adapted for meshing engagement with a gear carried by the main drive shaft of the motor cycle and a plurality of bars which are connected to the gear and the piston of the pump for reciprocating the piston during the rotation of the gear.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:

Figure 1 is a view showing the invention applied to an ordinary motor cycle.

Fig. 2 is a side elevation of the invention.

Fig. 3 is a side elevation of the invention showing the side opposite to that illustrated in Fig. 2.

Fig. 4 is a top plan view of the invention showing parts in section, and

Fig. 5 is a sectional view taken on the line 5—5 of Fig. 4.

Referring more particularly to the drawings, 1 designates the body plate of the improved tire pump, which is pivotally connected to a portion of the supporting frame of the motor cycle, by a bolt 2. The body plate 1 is also provided with a slot 3 extending therethrough, positioned at the end remote from the pivoted end. A bolt 4 extends through the slot 3 and is connected in any suitable manner to a portion of the motor cycle frame. A thumb screw 5 is mounted upon the bolt 4 for clamping engagement with the body plate 1 for securely holding the plate in adjusted pivotal positions.

The body plate 1 has a shaft 6 rotatably carried thereby upon which shaft is mounted a gear 7. The gear 7 meshes with a pinion 8, which is mounted upon the main power shaft 9 of the motor cycle, in any suitable manner, for synchronous rotation therewith. The body plate 1 is provided with an opening 10 through which the shaft 9 extends, which opening is large enough to accommodate the pinion 8.

A connecting rod 11 is pivotally connected as is shown at 12 to the gear 7 eccentrically of the axis of the gear and it has its end remote from the end which is connected to the gear 7 connected to a block 14 as is shown at 16. The block 14 is mounted upon a pin 16 which extends through a slot 17 formed in the body plate 1. A bar 18 is connected to the pin 16 and positioned upon the opposite side of the body plate 1, from the connecting bar 11. The connecting bar 18 is connected to a cross head 19 which cross head travels in a path or track formed by spaced bars 20 and 21. The cross head 19 has a piston rod 22 connected thereto which piston rod is connected to the piston 23 of an ordinary reciprocating piston air pump structure 24. The cylinder 25 of the air pump structure 24 is secured to an angled projection 26 which is formed upon the body plate 1 by bolts or analogous fastening devices 27. An outlet tube 28 is connected to the outlet end of the cylinder 24 and has a flexible tube 29 connected thereto, which may lead to either the front or rear tire of a motor cycle.

The body plate 1 has an ear 30 formed thereon which is provided with internally screw threaded bores 31 which adjustably supports a feed screw 32. A handle 33 of ordinary construction is mounted upon the upper end of the feed screw 32. The lower end of the screw 32 engages a portion of the motor cycle frame which is indicated by the numeral 34 in Fig. 3 of the drawings.

When the device is in an inoperative position, the body plate 1 is moved upon its pivotal support, so that the gear 7 will be out of mesh with the pinion 8, and when it is desired to inflate one of the tires of the motor cycle, the thumb nut 5 is loosened so as to permit of the pivotal movement of the plate upon its pivotal support, and the feed screw 32 is operated for moving the plate upon its pivotal support and moving the gear 7 into mesh with the pinion 8, which will rotate the gear and will through the medium of the connecting rods 11 and 18 and the piston rod 22 operate the piston 23 within the pump for compressing air which air is conducted to the tire to be inflated through the flexible conduit or tube 29.

From the foregoing description taken in connection with the accompanying drawings the advantages of construction and of the method of operation of the improved tire pump will be readily apparent to those skilled in the art to which this invention appertains, and while in the foregoing description the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a tire pump structure, the combination with a motor cycle frame and a main drive shaft for the motorcycle, of an elongated flat plate, means pivotally connecting said plate adjacent one end thereof with the frame of the motorcycle, a pump rigidly secured to said plate adjacent said pivotal connection, a gear carried by the opposite end of said plate, a pinion carried by said main drive shaft, means carried by said plate adjacent said gear to swing and hold said plate in adjusted position, a relatively long slot in said plate, a pin slidably mounted in said slot, a connecting rod pivotally secured to the gear and said pin, a guide way secured on said plate, a cross head slidably mounted in said guideway, a bar connecting said cross head and pin, and a rod connecting said cross head and the piston of a pump, as and for the purpose specified.

2. In a tire pump structure, the combination with a motorcycle frame and a main drive shaft for the motorcycle, of an elongated flat plate, means pivotally connecting the plate adjacent one end thereof to the frame of the motorcycle, a pinion carried by said main drive shaft, a gear rotatably carried by the opposite end of said plate and arranged above said pinion, a compressed air pump carried by said plate adjacent said pivot, means operatively connecting said gear with said pump, said plate having a slot therein adjacent said gear, means carried by said motorcycle frame and extending through said slot and engaging the walls thereof to hold said plate in an adjusted position and against relative movement, and means carried by said plate adjacent said gear to swing said plate on said pivotal connection to raise and lower said gear into and out of engagement with said pinion.

In testimony whereof I affix my signature in presence of two witnesses.

HARRY BYRON JONES.

Witnesses:
J. T. JONES,
GEO. N. BAUMGARTNER.

Copies of this patent may be obtained for five cents each, by addressing the "Commissioner of Patents, Washington, D. C."